United States Patent [19]

Danahy et al.

[11] 4,087,320

[45] May 2, 1978

[54] APPARATUS FOR CLEANING AN ENDLESS BELT HAVING AN AFFIXED SIGNAL ELEMENT

[75] Inventors: Thomas Michael Danahy, Niskayuna; Joseph Anthony Kilroy, Rensselaer, both of N.Y.

[73] Assignee: Huyck Corporation, Wake Forest, N.C.

[21] Appl. No.: 720,469

[22] Filed: Sep. 3, 1976

[51] Int. Cl.² .......................... D21F 1/32; B08B 3/02
[52] U.S. Cl. ............................... 162/252; 134/122 R; 162/277; 198/495; 239/71; 239/186
[58] Field of Search ............... 162/198, 199, 252, 256, 162/263, 277, 348, 358, 360 DP, DIG. 1; 134/15, 113, 122 R; 239/71, 72, 186; 198/495; 139/425 A; 428/234, 300

[56] References Cited

U.S. PATENT DOCUMENTS

| Re. 21,890 | 8/1941 | Walsh et al. | 428/234 |
| 3,067,779 | 12/1962 | Draper, Jr. | 139/425 A |
| 3,655,980 | 4/1972 | Bossen | 162/263 X |
| 3,739,605 | 6/1973 | Baker | 162/277 X |
| 3,910,815 | 10/1975 | Shelor | 162/277 X |

FOREIGN PATENT DOCUMENTS 1,157,609  7/1969  United Kingdom ................. 162/348

Primary Examiner—Richard V. Fisher
Attorney, Agent, or Firm—Sanford S. Wadler

[57] ABSTRACT

An endless belt comprising a signal element affixed thereto for identifying one complete revolution of such belt and an apparatus for cleaning such belt. Advantageously, such belt and cleaning apparatus may be used in combination with an apparatus such as, for example, a papermaking machine.

15 Claims, 3 Drawing Figures

APPARATUS FOR CLEANING AN ENDLESS BELT HAVING AN AFFIXED SIGNAL ELEMENT

BACKGROUND OF THE INVENTION

1. Field of the Invention

This invention relates to a method and apparatus for cleaning materials moving in an endless path by application and/or extraction of fluid.

2. Description of the Prior Art

It is known to use conveyor belt-like materials in the manufacture of certain products; as, for example, paper and paper-like products. In the papermaking process such belts are porous in nature and are commonly referred to as papermakers' fabrics, felts or wires. As a result of their continuous use during the papermaking process there is a tendency for the porosity of such belts to vary as their surface and/or internal portions (interstices) begin to accumulate (a) quantities of the furnish or pulp-like material used in the manufacture of paper, and (b) other contaminants found in the papermaking environment. Such variation in porosity is undersirable in that it adversely affects the quality of the paper being produced. For example, the non-uniformity of the porosity of a papermakers' felt which travels in an endless path in the press section of a papermaking machine will cause non-uniform dewatering of the paper web being carried through the press section by such a felt. It is known that such non-uniform dewatering may adversely affect the surface characteristics of the finished paper product. Passage of a belt such as a press felt through a press section nip formed by a pair of press rolls also tends to continuously compress the felt which eventually causes permanent deformation of the fibrous materials which comprise the felt. Such elimination of the bulky nature of a press felt may affect its operational characteristics at least to the extent that its ability to carry water and to contact the pulp material without marking the paper web may be adversely affected.

In order to clean, rebulk or otherwise recondition such porous belts, various apparatus have been developed. For example, in the papermaking process it is known to utilize an oscillating high-pressure needle shower which generally functions as a result of the recirprocatory motion of a plurality of nozzles, each of which directs a jet of water against the surface of a moving papermakers' felt. Such reciprocatory motion is generally in a direction transverse to the direction in which the endless felt travels. In operation, the cleaning cycle of such nozzles is determined by trial and error taking into consideration variables such as the type and length of the felt, nozzle reciprocation speed and spacing, and the paper machine speed. In using such devices, uniform and total felt coverage is premised upon a uniform oscillating motion of the shower nozzles and a paper machine operating at a constant speed. However, in such structures, even a momentary change in the speed of the paper machine or the oscillating shower nozzles will tend to eliminate the synchronization of the nozzle speed vis-a-vis the felt speed which will, in turn, cause non-uniform and less than total cleaning and reconditioning of the felt. To overcome this problem apparatus has been described in Shelor, U.S. Pat. No. 3,910,815, which attempts to synchronize the speed of a papermakers' felt with the speed of a nozzle means as it travels from one edge of the felt to the other. Such synchronization is generally accomplished by providing a traversing vehicle which includes nozzle means and which travels across the width of the felt at some predetermined speed that is directly related to the felt speed. For example, in the preferred embodiment described in the Shelor patent the traversing vehicle is ultimately driven a predetermined distance by a stepping motor which causes such movement in response to a power pulse received from a pulse generator coupled to one of the press rolls. In operation, the pulse generator emits a specified number of electrical pulses for each revolution of the coupled press roll to actuate the stepping motor and cause the traversing vehicle to move a predetermined distance. In this manner synchronization of felt speed with the speed of the nozzle means is controlled by the speed of the press rolls; that is, as the revolutions per minute of the press rolls increase the revolutions per minute of the papermakers' felt increase, and as the revolutions per minute of the press rolls decrease the revolutions per minute of the papermakers' felt decrease. However, when the papermakers' felt stretches during operation it would be necessary for the machine operator to first observe such stretch and then to properly adjust the speed of the press rolls or nozzle in order for synchronization to be maintained. If the machine operator did not observe that the press felt had stretched, then synchronization would be eliminated until such time as an adjustment was made in the speed of the press rolls or nozzle to compensate for such stretch. Until such an adjustment was made, the cleaning pattern which the oscillating shower traverses would become non-uniform to the extent that (a) some areas of the felt might not be subjected to the nozzle emission, and (b) those areas of the felt which were subjected to the nozzle emission might not be subjected to the same degree of exposure. These problems are especially significant when such shower units are used with press felts since it is known that a press felt is particularly subjected to various increases in length throughout its life. Accordingly, in order to maintain the desired synchronization of the felt speed vis-a-vis the speed of the nozzle using a device of the type described in the Shelor patent, it would be necessary to continuously monitor the felt length on the paper machine. Additional monitoring would be required throughout the life of the felt to assure that machine speed would be adjusted to compensate for any further increases in length of the felt due to stretch. We do not believe that such monitoring and adjustments by the machine operator are practical or desirable in the ordinary papermaking environment.

Shower units of the type described in the Shelor patent appear to be designed to utilize nozzle means affixed to a single traversing vehicle. By so limiting the number of nozzles there may be a tendency for a reduction in the uniformity of the cross machine or transverse direction porosity. This occurs as a result of the fact that, by the time such vehicle traverses across the felt, areas of the felt first subjected to the emission of the nozzles have again become plugged or otherwise contaminated with the area of the felt furthest removed from the shower unit, measured in the cross-machine direction, being most affected; the area of the felt towards its middle portion being less affected; and the area of the felt in the vicinity of the shower unit being the least affected.

It is an object of the present invention to provide an apparatus for cleaning endless belts which is simple in construction.

It is another object of the present invention to provide an apparatus for cleaning endless belts having a minimum number of mechanical parts.

It is a further object of the present invention to provide an apparatus for cleaning an endless belt which subjects all areas of the belt to the same degree of exposure to a cleaning fluid.

Still a further object of the present invention is to provide an apparatus for cleaning an endless felt which uniformly rebulks, reconditions and cleans all areas of such felt.

Yet a further object of the present invention is to provide a shower element which moves in the transverse direction such that it is continuously and automatically synchronized to the speed of an endless belt.

Another object of the present invention is to provide a shower element which moves in the transverse direction such that it is continuously and automatically synchronized to the revolutions of a papermakers' fabric or felt to provide uniform cleaning of the fabric or felt regardless of whether the length of the fabric or felt or the speed of the machine changes.

SUMMARY OF THE INVENTION

The above and other objects of the present invention can be accomplished by the provision of an apparatus for cleaning endless belts having a signal element affixed thereto comprising (a) a shower element which in operation is positioned in proximity to the belt; (b) means interconnected with the shower element for moving it a predetermined transverse distance relative to the width of the belt upon actuation; (c) a sensing element interconnected with the moving means for actuating the moving means in response to one complete revolution of the belt; and (d) means attached to the shower element for supplying fluid under pressure. Also provided is an endless belt comprising a signal element affixed thereto for identifying one complete revolution of such belt. Such belt and cleaning apparatus may be used in combination with an apparatus such as, for example, a papermaking machine. dr

BRIEF DESCRIPTION OF THE DRAWINGS

These and other objects will become apparent from the detailed discussion which follows and from the accompanying drawings.

DESCRIPTION OF THE PREFERRED EMBODIMENTS

Figure 1:
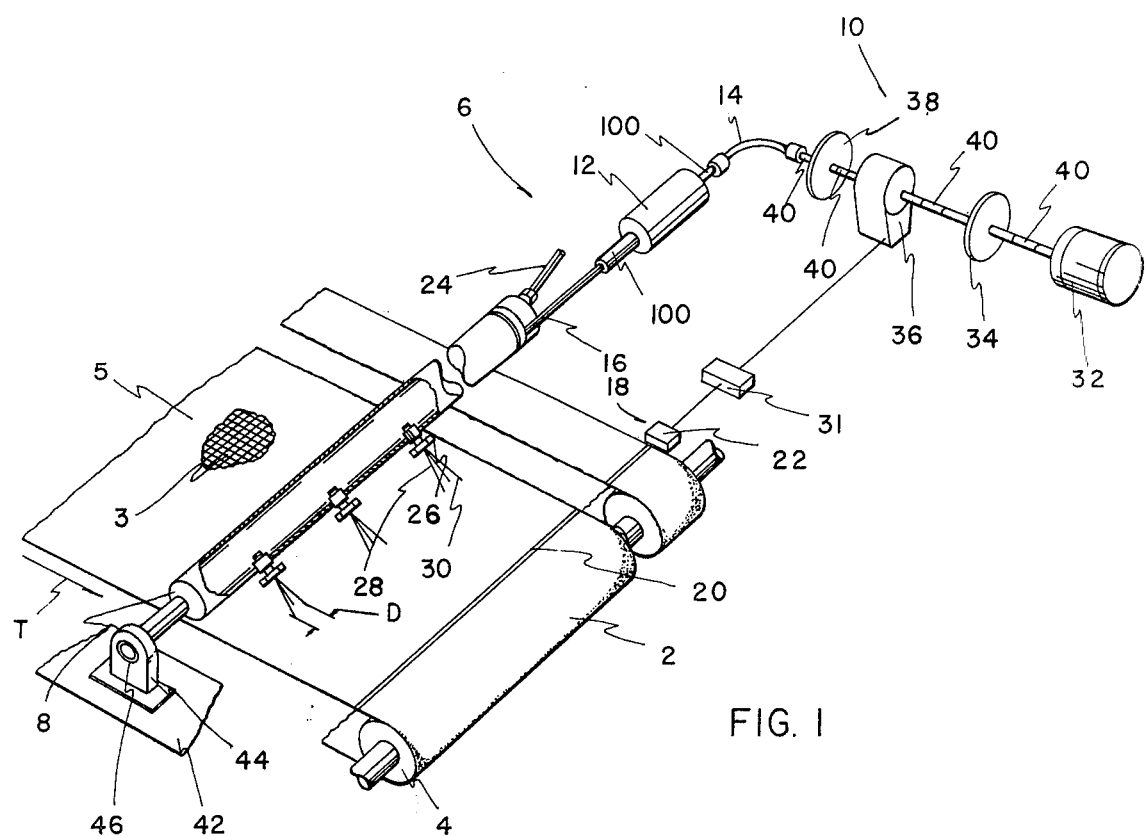
FIG. 1 is a diagramatic view of the apparatus for cleaning endless belts of the present invention in combination with a diagramatic view of a portion of a papermaking machine.

Looking now to FIG. 1, there is schematically depicted an endless belt 2 such as a papermakers' felt, having a signal element affixed thereto, which travels about a plurality of rolls 4 (only one shown) during the papermaking operation. The felt 2 is continuously plugged or filled with portions of stock or pulp used in the papermaking operation and other contaminants which must be removed to assure that the felt functions properly. Similarly, it is desirable to maintain as much bulk or body in the felt 2 during its life. In order to achieve these and other objects, an apparatus for cleaning endless belts, generally designated by the number 6, is provided which comprises a shower element 8, including an internal cavity, which is positioned in proximity to the belt or felt 2. Means are also provided, which are interconnected to the shower element 8, for causing shower element 8 to move upon actuation a predetermined distance relative to the width of the felt 2 in the transverse or cross-machine direction. In the embodiment depicted in FIG. 1 such moving means include a driving element generally designated as 10 which is interconnected with a translating element 12 by means of a coupling 14, the translating element 12 also being interconnected with shower element 8 by means of coupling 16. As noted above, felt 2 includes a signal element such as, for example, signal element 20 which is affixed to felt 2 for identifying one complete revolution of felt 2. Signal element 20 may be a metallic material affixed to felt 2 by suitable means. For example, if the papermakers' felt 2 includes a woven layer having yarns 3, then a yarn which is or includes a metallic constituent can be woven into such layer. If such woven layer has a non-woven fibrous layer 5 needled thereto, then a portion thereof can comprise a metallic constituent. In another example, a metallic insert may be inserted within the body of the felt at that point where such insert will be in proximity to a sensor 22, as described herein, at least once per felt revolution. Of course, any other suitable means may be used to affix a signal element to felt 2 or any other type of endless belt. In addition, materials other than metal may be used, provided such materials are conducive to signalling the sensor 22 of the present invention. A sensing element generally designated as 18 is interconnected with the moving means for actuating the moving means in response to one complete revolution of the felt 2. In the embodiment depicted in FIG. 1, such sensing element includes a sensor 22 positioned in proximity to felt 2 for identifying one complete revolution of signal element 20. Means such as hose 24 are also attached to shower element 8 for supplying fluid under pressure into the cavity of the shower element 8. The source of the pressurized fluid being supplied to the hose 24 is not shown but may be any means which will supply fluid in a sufficient amount and under sufficient pressure. For example, in some applications an ordinary pump may be used to pump a fluid such as tap water into hose 24. In the embodiment depicted in FIG. 1, shower element 8 includes a plurality of nozzles 26, each of which have at least one orifice which communicates with the cavity of the shower element 8 so that during operation nozzles 26 emit a fluid jet 28 which impinges upon the surface of felt 2 at select positions 30 across the width of belt 2. Nozzles 26 may be any type useful in allowing a fluid jet to impinge upon the surface being cleaned. For example, although needle jet-type nozzles are preferred, fan nozzles may also be used.

In operation, felt 2 revolves about roll 4 while paper is being produced on the papermaking machine. Fluid under pressure is supplied into shower element 8 through hose 24. Each time that signal element 20 passes sensor 22, sensor 22 sends a signal to the driving element 10 which is then actuated to the extent it causes translating element 12 to repeat one operating cycle per belt revolution. Due to the interconnection of translating element 12 and shower element 8 by means of coupling 16, each repeated operating cycle causes shower element 8 to move a predetermined distance relative to the width of felt 2 in the transverse direction. The nozzles 26 also move in the same manner since they are affixed to shower element 8, and this causes the fluid jets 28 and impingement positions 30 to similarly move in the same manner. As the jets of fluid so move, the fluid impingement upon the felt surface conditions, rebulks and otherwise cleans the felt. Although not necessary, in the preferred embodiment the predetermined distance is equal to the width dimension D of the area or position of impingement 30 of one of the fluid jets 28. As can be seen, the width dimension D is measured in a direction transverse to the direction of travel T of the felt 2. Such an impingement area assures the use of a minimum amount of water to achieve complete and uniform cleaning of the felt. Without limiting our invention to any particular dimension D it has been found that one acceptable embodiment utilizes a width dimension D of 0.080 inch. In order to assure uniform felt coverage, it is necessary for each operating cycle to be completed at least within the time required for the belt to complete one revolution. In this manner, the nozzles move incrementally in one direction across the width of the belt in response to each revolution of the belt until the entire belt width has been subjected to fluid impingement, at which time the nozzles reverse direction and move incrementally back to their starting position and, in the reverse process, again subject the entire width of the belt to fluid impingement. This process is repeated during the papermaking process. We have found that by using a multiplicity of equally spaced nozzles across the full width of the felt, complete and uniform cleaning of the felt can be accomplished in a short period of time.

Sensor 22 can be any device which can be appropriately actuated as described herein in response to a signal element such as, for example, signal element 20. For example, a microsonic probe of the type manufactured by Hyde Park Electronics, Inc. of Dayton, Ohio can be used. Such a probe comprises a transmitter and receiver probe. The transmitter generates an ultrahigh frequency acoustical beam that is bounced off or interrupted by an object such as signal element 20 and then detected by the matching receiver. Preferably, however, sensor 22 is a non-contact metal sensing proximity device of the type manufactured by Electro Corporation of Sarasota, Fla. Such proximity device is combined with an integral solid-state AC switch. The device senses any conductive metal target by using eddy-current principles. A load is reflected back to a high-frequency oscillator which causes a switching action. Although less desirable, it is also possible to utilize a contacting-type sensor 22 which is actuated as a result of actual engagement with signal element 20.

In those cases where the signal emitted from the sensor 22 is not strong enough, or the duration of its pulse is not long enough, to properly actuate driving means 10, it may be necessary to provide sensing element 18 with an amplifying unit 31 to accomplish this purpose. One such unit could include an amplifier and an output relay to which the amplifier is interconnected.

In operation, when proximity switch 22 is actuated by signal element 20, proximity switch 22 sends out a signal to unit 31. At unit 31 the signal is amplified to the degree required to switch an output relay to its "on" position which in turn actuates driving element 10 to which unit 31 is interconnected. In order to assure that driving element 10 is actuated long enough to allow translating element 12 to repeat one operating cycle, it may be necessary for unit 31 to include an amplifier capable of continuing for the required time period the actuation of the output relay when the signal element 20 is no longer in proximity of sensor 22.

In the embodiment of FIG. 1 driving element 10 is depicted as including a motor 32, a first gear reducer 34, a single revolution clutch 36, and a second gear reducer 38, all of such constituent units being interconnected with each other by couplings 40 and with translating element 12 by coupling 14. The function of driving element 10 is to cause coupling 14 to revolve a predetermined number of degrees upon actuation of driving element 10, as described herein, which will cause translating element 12 to repeat one operating cycle. To accomplish this, preferably, motor 32 is continuously actuated during the papermaking operation and, similarly, reducing gear 34 continuously reduces the revolutions per minute (RPM) of the motor to a degree sufficient for use in combination with clutch 36. When the single revolution clutch 36 is actuated, it allows the output shaft of clutch 36 to revolve 360°. In order to allow coupling 14 to revolve said predetermined number of degrees, which in the embodiment described herein is less than 360°, the output shaft of clutch 36 is interconnected with the second gear reducer 38 which makes the required reduction. In this manner, the output shaft of gear reducer 38 causes coupling 14 to revolve said predetermined number of degrees.

It should be clear that other types of driving elements 10 can be used provided they can utlimately cause translating element 12 to repeat one operating cycle. In addition, the driving element 10 described above may, in some cases, be modified by eliminating either or both of the gear reducers 34, 38 and/or the clutch 36. In the embodiment described above, the portion of the driving element 10 which is actuated by the sensing element 18, is the single revolution clutch 36, although in other embodiments another portion of a driving element may be actuated by sensing element 18.

Figure 2:
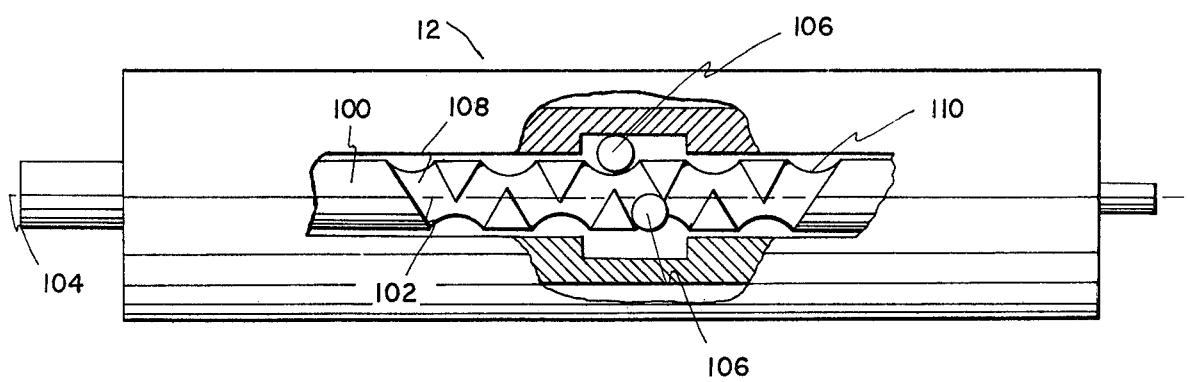
FIG. 2 is an enlarged view, partially in section, of the translating element depicted in FIG. 1.
Figure 3:
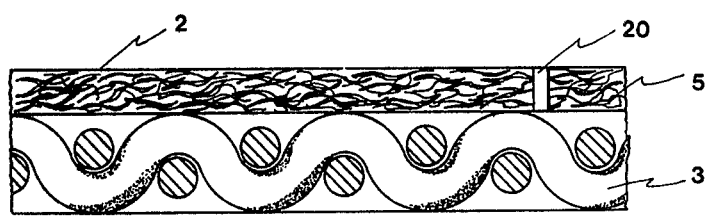
FIG. 3 is an enlarged view, partially in section, of the felt depicted in FIG. 1, wherein a signal element comprises a portion of the non-woven fibrous layer.

In the preferred embodiment translating element 12 may comprise a ball reverser such as, for example, the type manufactured by Norco, Inc. of Georgetown, Conn. This type of ball reverser is a mechanical actuator device of the type depicted in the cut-away view shown in FIG. 2 in which a rotating shaft 100 having grooves 102 on its face is caused to slide back and forth along its longitudinal axis 104 by using balls 106 as cam followers. In the embodiment depicted, three balls are used which are spaced from each other about the longitudinal axis 104. The distance which the shaft 100 moves along its longitudinal axis 104 is dependent upon the number of revolutions to which the shaft 100 is subjected. In the preferred embodiment one operating cycle is defined as the predetermined longitudinal distance which the shaft moves. The shaft 100 of the ball reverser depicted in FIG. 3 may be caused to move from left to right in response to rotation of shaft 100 about its longitudinal axis 104. At the completion of each operating cycle shaft 100 will have moved from left to right a distance defined by the number of revolutions to which shaft 100 is subjected. After a plurality of such operating cycles, surface 108 of groove 102 will be adjacent balls 106; at which time, additional operating cycles will cause shaft 100 to move from right to left until such time as surface 100 of groove 102 is adjacent balls 106; at which time, the sequence repeats itself. Of course, other types of translating elements may be used provided they cause shower element 8 to move upon actuation a predetermined distance relative to the width of the belt in the transverse direction.

Preferably, shaft 100 is caused to rotate by means of the rotation of coupling 14 which is depicted as a standard flexible shaft which is affixed at one end to shaft 100 of the translating element 12 and at the other end to coupling 40 of gear reducer 38.

Shower element 8 may be affixed to the papermaking machine 42 in any manner which will allow shower element 8 to move in the transverse direction as described herein. For example, in the embodiment depicted in FIG. 1, shower element 8 is mounted to papermaking machine 42 by means of a mounting bracket 44 which includes a linear bearing member 46. Although only one side of the papermaking machine 42 is shown, a corresponding mounting means may be affixed to the opposite side of the papermaking machine and shower element 8. The operation of an apparatus including the various specific preferred elements described above will now be described. Each time that felt 2 completes one revolution the metallic signal element 20 signals sensor 22. As noted above, preferably sensor 22 is a proximity switch which is actuated when it senses the conductive metal target and sends out a signal to unit 32. At unit 32 the signal is amplified and switches an output relay to its "on" position which actuates the single revolution clutch 36 to which it is interconnected. The clutch 36 is interconnected to gear reducer 34 which reduces the RPM of the drive shaft of motor 32 to a degree which is conducive for use in combination with clutch 36. The actuation of clutch 36 by unit 32 is such as to cause the output shaft of clutch 36 to revolve 360°. By connecting gear reducer 38 between clutch 36 and coupling 14, the 360° revolution of the output shaft of clutch 36 is reduced to the desired extent to allow coupling 14 to revolve the number of degrees which will cause translating element 12 to repeat one operating cycle. The so-limited rotation of coupling 14, which in the preferred embodiment is a standard flexible shaft, causes shaft 100 of translating element 12 to rotate a corresponding number of degrees and to thereby complete one operating cycle. By completing one operating cycle, shaft 100 is caused to move along its longitudinal axis 104. In view of the connection between translating element 12 and shower element 8 by means of coupling 16, such longitudinal movement causes shower element 8, nozzles 26, jets 28 and impinging areas 30 to move a corresponding distance relative to the width of belt 2 in the transverse direction. As noted above, preferably coupling 14 is caused to revolve sufficiently to allow the distance of such longitudinal movement to be equal to the width dimension D defined herein.

The apparatus for cleaning endless belts of the present invention is simple in construction and comprises a minimum number of mechanical parts. The apparatus subjects all areas of an endless belt to the same degree of exposure to a cleaning fluid. In this manner an apparatus is provided for cleaning an endless papermakers' felt which uniformly rebulks, reconditions and cleans all areas of the felt. A shower element is provided which moves in the transverse direction such that it is continuously and automatically synchronized to the revolutions of an endless belt, felt or fabric regardless of whether the length of the belt, felt or fabric, or the speed of the machine, changes. Such apparatus allows for movement, in the transverse direction, of a multiplicity of equally spaced nozzles across the full width of the belt, felt, or fabric if desired, to provide total coverage of the belt in a short period of time.

It is to be understood that the embodiments herein illustrated and discussed, and the terms and expressions which have been employed, are by way of illustration and not of limitation and that there is no intention in using any of them to exclude any equivalents of the features shown or described, or portions thereof, since it will be recognized by those skilled in the arts that this invention may be practiced in a wide variety of forms and embodiments without departing from the spirit and scope of this invention.

We claim:
1. An apparatus including,
   (A) An endless belt comprising a signal element affixed thereto for identifying one complete revolution of said belt;
   (B) A shower element;
   (C) Means interconnected with said shower element for moving said shower element a predetermined transverse distance relative to the width of said belt upon actuation;
   (D) A sensing element interconnected with said moving means for actuating said moving means in response to one complete revolution of said signal element affixed to said belt; and,
   (E) Means attached to said shower element for supplying fluid under pressure.
2. The apparatus of claim 1 further characterized by the fact that said apparatus is a section of a papermaking machine and said belt is a papermakers' belt.
3. An apparatus for cleaning an endless belt having a signal element affixed thereto comprising a shower element, means interconnected with said shower element for moving said shower element a predetermined transverse distance relative to the width of said belt upon actuation, a sensing element interconnected with said moving means for actuating said moving means in response to one complete revolution of said signal element affixed to said belt, and, means attached to said shower element for supplying fluid under pressure.
4. The apparatus of claim 3 wherein said shower element comprises a plurality of spaced nozzles each of which emits a fluid jet when in operation which impinges upon the surface of said belt at select positions across the width of said belt.
5. The apparatus of claim 4 wherein said predetermined transverse distance is equal to the width dimension of the area of impingement of one of said fluid jets, said width dimension being measured in a direction transverse to the direction of travel of said belt.
6. The apparatus of claim 5 wherein said sensing element includes a sensor interconnected to said moving means which sensor in operation is positioned in proximity to said belt for identifying one complete revolution of said signal element.
7. The apparatus of claim 6 wherein said sensor is interconnected to said moving means by means of an amplifying unit which is interconnected to said sensor and said moving means.
8. The apparatus of claim 3 wherein said moving means includes a driving element interconnected with said sensor, and a translating element interconnected with said driving element and said shower element.
9. The apparatus of claim 8 wherein said driving element includes a motor interconnected with a clutch, said clutch also being interconnected with said sensor and a gear reducer, and said gear reducer being interconnected with said translating element.

10. The apparatus of claim 9 wherein a second gear reducer is interconnected between said motor and said clutch.

11. The apparatus of claim 8 wherein said translating element is a ball reverser.

12. The apparatus of claim 11 wherein said translating element is interconnected to said driving element by means of a flexible shaft.

13. The apparatus of claim 12 wherein said sensor comprises a proximity device.

14. An apparatus for cleaning an endless belt having a signal element affixed thereto comprising,
- (A) A shower element which comprises a plurality of spaced nozzles each emitting a fluid jet when in operation which impinges upon the surface of said belt at select positions across the width of said belt;
- (B) A driving element which comprises a motor which is interconnected with and drives a clutch, said clutch also being interconnected with a gear reducer;
- (C) A ball reverser interconnected with said shower element for moving said shower element a predetermined transverse distance relative to the width of said belt upon actuation, and with said gear reducer by means of a flexible shaft, said predetermined distance being equal to the width dimension of the area of impingement of one of said fluid jects and said width dimension being measured in a direction transverse to the direction of travel of said belt;
- (D) An amplifying unit interconnected with said clutch for actuating said clutch when actuated by a sensing element such that said clutch drives said gear reducer and said flexible shaft actuates said ball reverser; and,
- (E) A sensing element which comprises a proximity device interconnected with said unit, said device in operation being positioned in proximity to said belt for actuating said unit in response to one complete revolution of said signal element.

15. The apparatus of claim 14 wherein said driving element includes a second gear reducer interconnected between said motor and said clutch.

* * * * *

UNITED STATES PATENT OFFICE
CERTIFICATE OF CORRECTION

Patent No. 4,087,320          Dated May 2, 1978

Inventor(s) Danahy et al.

It is certified that error appears in the above-identified patent and that said Letters Patent are hereby corrected as shown below:

Column 1, line 45: Change "recirprocatory" to "reciprocatory"

Column 3, line 41: Delete "dr"

Column 6, line 30: Change "utlimately" to "ultimately"

Column 10, line 7: Change "jects" to "jets"

Signed and Sealed this

*Nineteenth* Day of *September 1978*

[SEAL]

*Attest:*

RUTH C. MASON
*Attesting Officer*

DONALD W. BANNER
*Commissioner of Patents and Trademarks*